United States Patent
Sugata et al.

(10) Patent No.: US 6,305,696 B1
(45) Date of Patent: Oct. 23, 2001

(54) TOOL HOLDER FOR MACHINE TOOL

(75) Inventors: Shinsuke Sugata; Takashi Kobayashi, both of Hiroshima-ken (JP)

(73) Assignee: Horkos Corporation, Hiroshima (JP)

( * ) Notice: Subject to any disclaimer, the term of this patent is extended or adjusted under 35 U.S.C. 154(b) by 0 days.

(21) Appl. No.: 09/506,274

(22) Filed: Feb. 17, 2000

(51) Int. Cl.$^7$ ..................................................... B23B 51/06
(52) U.S. Cl. .............................................. 279/20; 408/57
(58) Field of Search ............................ 279/20; 408/56, 408/57, 59

(56) References Cited

U.S. PATENT DOCUMENTS

| | | | |
|---|---|---|---|
| 4,640,652 | * | 2/1987 | Rivera, Jr. ................................ 279/20 |
| 5,076,740 | * | 12/1991 | Petrie ...................................... 408/59 |
| 5,674,031 | * | 10/1997 | Bilz ........................................ 279/20 |
| 6,135,679 | * | 10/2000 | Kazda ..................................... 408/57 |

* cited by examiner

*Primary Examiner*—Steven C. Bishop
(74) *Attorney, Agent, or Firm*—Venable; John P. Shannon; Chad C. Anderson

(57) ABSTRACT

The tool holder for machine tool includes grip 10a on an outer circumference held on an automatic exchange of a cutting edge 8. A through hole 10b is in the longitudinal center. An internal thread (g) is on one end of through hole 10b, and a tool stopper 11 is screwed on internal thread (g). A through hole 11a is in the longitudinal center of tool stopper 11. A conical engaging body 10c is on the other end of through hole 10b, so that conical engaging body 10c protrudes outwards. The conical engaging body 11c connects with a tool shank taper (n) and a flanged end face (m) of a main spindle. A mist receiving tube 12 is on a connecting side of through hole 10b, and a through hole 12a is in the longitudinal center of the mist receiving tube 12. A communicating tube 14 is in the through hole 12a of mist receiving tube 12 and through hole 11a of tool stopper 11, so that communicating tube 14 bridges them to flow cutting oil directly thereinside. The communicating tube 14 can suitably slide in through hole 12a in accordance with motions of the tool stopper 11 due to the different length of cutting edge 8.

3 Claims, 4 Drawing Sheets

TOOL HOLDER FOR MACHINE TOOL

FIELD OF THE INVENTION

This invention relates to an improvement of a tool holder for a machine tool, particularly relates to a tool holder suitable for a dry cutting work.

DESCRIPTION OF THE RELATED ART

In processing with a machine tool, a large amount of cutting oil is supplied to a cut part in order to cool down and lubricate a workpiece and a cutting edge, and to remove cutting chips. This causes various problems such as environmental pollution, adverse influence on human health, high cost in treating waste oil, lower longevity of a cutting edge due to excessive cooling of the workpiece, firictional wearing of the cutting edge due to excessive oil supplied during fine processing. Besides, since a large amount of cutting oil adheres to chips during processing, it is necessary to remove the cutting oil from the chips to treat and recycle them.

To solve the above problems, a very small amount of cutting oil is atomized and supplied to a cut part of the workpiece of late. This treatment is called dry cutting.

In this dry cutting, it is easy to supply a mist of cutting oil to the tip of the cutting edge during processing a relatively shallow part of the workpiece. This is carried out by fixing a spray nozzle beside the cutting edge. However, it is actually difficult during processing a relatively deep part of the workpiece. To cope with this problem, cutting oil is supplied into the cutting edge from a main spindle body, and spouted from the tip of the cutting edge during processing.

FIG. 4 is a cross-sectional view of a conventional embodiment. The numeral 1 is a main spindle supporting frame for a machine tool, and 2 is a main spindle that is rotatably inserted therein by means of bearings 3. The numeral 4 is a canister that rotatably holds steel balls 4a for engagement at the tip of the main spindle. The numeral 5 is made into a ring for fixing the canister 4 to the main spindle 2. A front face of the ring 5 is a vertical flanged end face (m), and a central hole of the ring 5 comprises a flaringly inclined face (n) (which is called a tool shank taper). The numeral 6 is a clamp rod that slidably go back and forth in the main spindle 2.

In FIG. 4, 7 is a tool holder having a cutting edge 8 at the tip. A grip 7a is formed at an outer circumference of the holder 7 so as to be held at an automatic exchange for the cutting edge. In addition, a longitudinal through hole (s) is provided in the center of the tool holder 7. One side of the through hole (s), which the cutting edge 8 is installed into, is formed as an internal thread. A tool stopper 7b that moves in accordance with the length of the cutting edge 8 is screwed on the internal thread. The other side of the through hole (s) is provided with a conical engaging body 7c that protrudes outwards. The conical engaging body 7c are in contact with both the front end face (m) and the taper (n) of the ring 5. Besides, it has a round hole 7d, into which the steel balls 4a of the canister 4 are freely inserted.

When the conical engaging body 7c is inserted into tile central through hole of the ring member 5, the clamp rod 6 is pulled to an arrow direction (a) by means of a non-illustrated spring mechanism. Then, the steel balls 4a protrude from a round hole 4b of the canister 4 to the round hole 7d, thereby causing the tool holder 7 to be engaged with the main spindle 2. Here, the conical engaging body 7c is in firm contact with both the end face (m) and the taper (n).

In the above embodiment, the cutting oil is supplied into a central hole 6a of the clamp rod 6 by a non-illustrated cutting oil feeder. Then. it flows into the through hole (s) of the tool holder 7 from the tip of the central hole 6a, and further into a central through hole (h) of the tool stopper 7b and an internal through hole (t) of the cutting edge 8 in tile tool holder 7. Then, it is sprayed from the tip of the internal through hole (t).

In the above conventional embodiment, a cross-sectional area (s1) of a path in the clamp rod 6, a cross-sectional area (s2) of a path in the tool holder 7, and a cross-sectional area (s3) of a path in the tool stopper 7b are various as shown in the figure. In addition, the cutting oil is supplied at a constant pressure. However, since the main spindle 2 and the tool holder 7 having the cutting edge on the tip thereof are rotated in high-speed, mist grains of atomized cutting oil may be centrifuged and liquidized by the centrifugal force caused by their rotations. This prevents the cutting oil from flowing smoothly.

SUMMARY OF THE INVENTION

An object of the invention is to solve the above problems.

A tool holder for a machine tool of this invention has the following structures. A grip 10a is provided on an outer circumference of the tool holder 10 to be held on an automatic exchange of a cutting edge 8. A through hole 10b is provided in the longitudinal center of the tool holder 10. An internal thread (g) is provided on one end of the through hole 10b, and a tool stopper 11 screwed on the internal thread (g). A through hole 11a is provided in the longitudinal center of the tool stopper 11. A conical engaging body 10c is provided on the other end of the through hole 10b, so that the conical engaging body 10c protrudes outwards. Because the conical engaging body 10c connects with a tool shank taper (n) and a flanged end face (m) of a main spindle, the tool holder 10 is constrained by two faces. A mist receiving tube 12 is provided on a connecting side of the through hole 10b, and a through hole 12a is provided in the longitudinal center of the mist receiving tube 12. A communicating tube 14 is provided in the through hole 12a of the mist receiving tube 12 and the through hole 11a of the tool stopper 11, so that the communicating tube 14 bridges them to flow cutting oil directly thereinside. Besides, the communicating tube 14 can suitably slide in the through hole 12a in accordance with motions of tool stopper 11 due to the different length of cutting edge 8.

According to this invention, the mist receiving tube is provided to the tool holder on its connecting side with the main spindle, and the communicating tube is provided between the mist receiving tube and the tool stopper so as to bridge them. Therefore, the cutting oil are supplied directly from the main spindle to the cutting edge with as least resistance as possible caused by different steps.

Accordingly, the present invention has the following effects.

Especially in a dry cutting, in which a cutting oil is atomized, mist grains are not centrifuged nor liquidized by the centrifugal force due to rotations of the tool holder. Besides, the cutting oil can flow smoothly and efficiently.

DETAILED DESCRIPTION OF THE PREFERRED EMBODIMENT

An embodiment of the present invention will be described with reference to the drawings.

Figure 1:
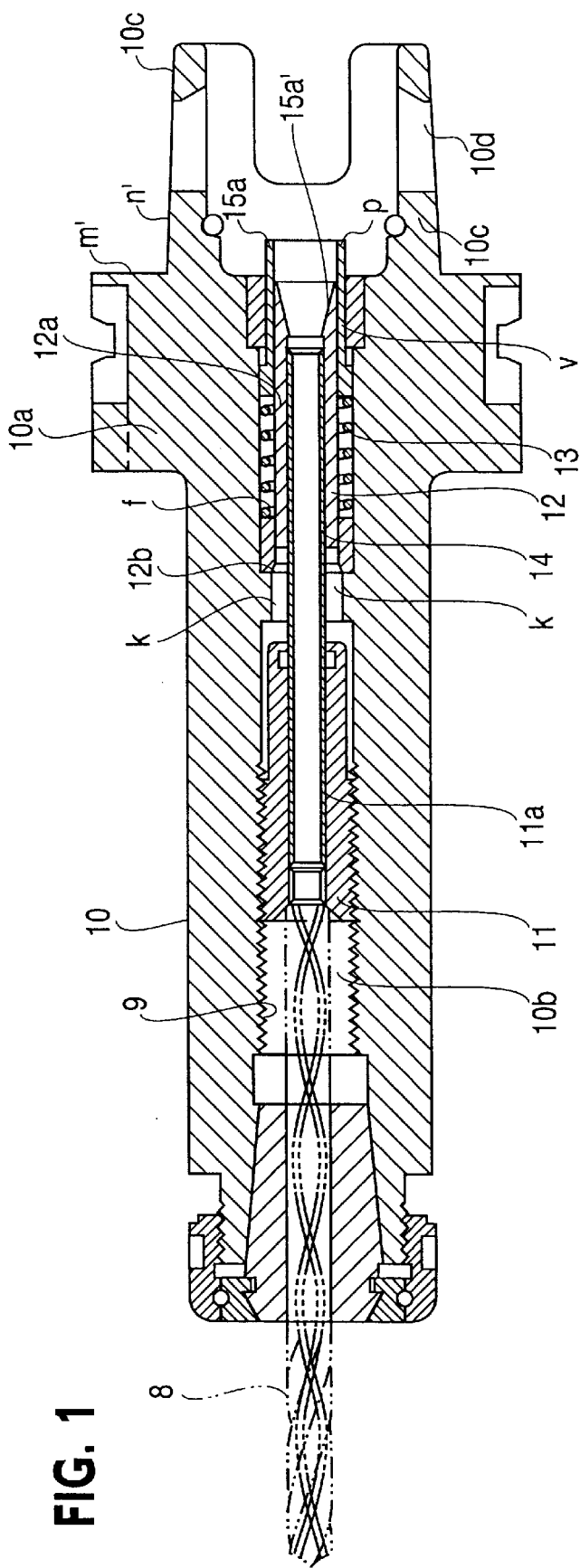
FIG. 1 is a cross-sectional view of a tool holder for a machine tool according to the present invention.

FIG. 1 is a cross-sectional view of a tool holder according to the present invention. In FIG. 1, 10 is a tool holder having a cutting edge 8 on the tip thereof, 10a is a grip provided to the outer circumference so as to be held at an automatic exchange of the cutting edge 8, and 10b is a relatively large through hole provided in the longitudinal center thereof. One side of the through hole 10b, to which the cutting edge 8 is installed is formed as an internal thread (g), and a tool stopper 11 is screwed thereinto. The tool stopper 11 moves in accordance with the length of the cutting edge 8. On the other hand, the other side of the through hole 10b is provided with a conical engaging body 10c that protrudes outwards. Here, the conical engaging body 10c is provided with a vertical face (m') and a taper face (n'), which are in contact with a vertical flanged front end face (m) and a tool shank taper (n) of a ring 5, respectively.

Figure 4:
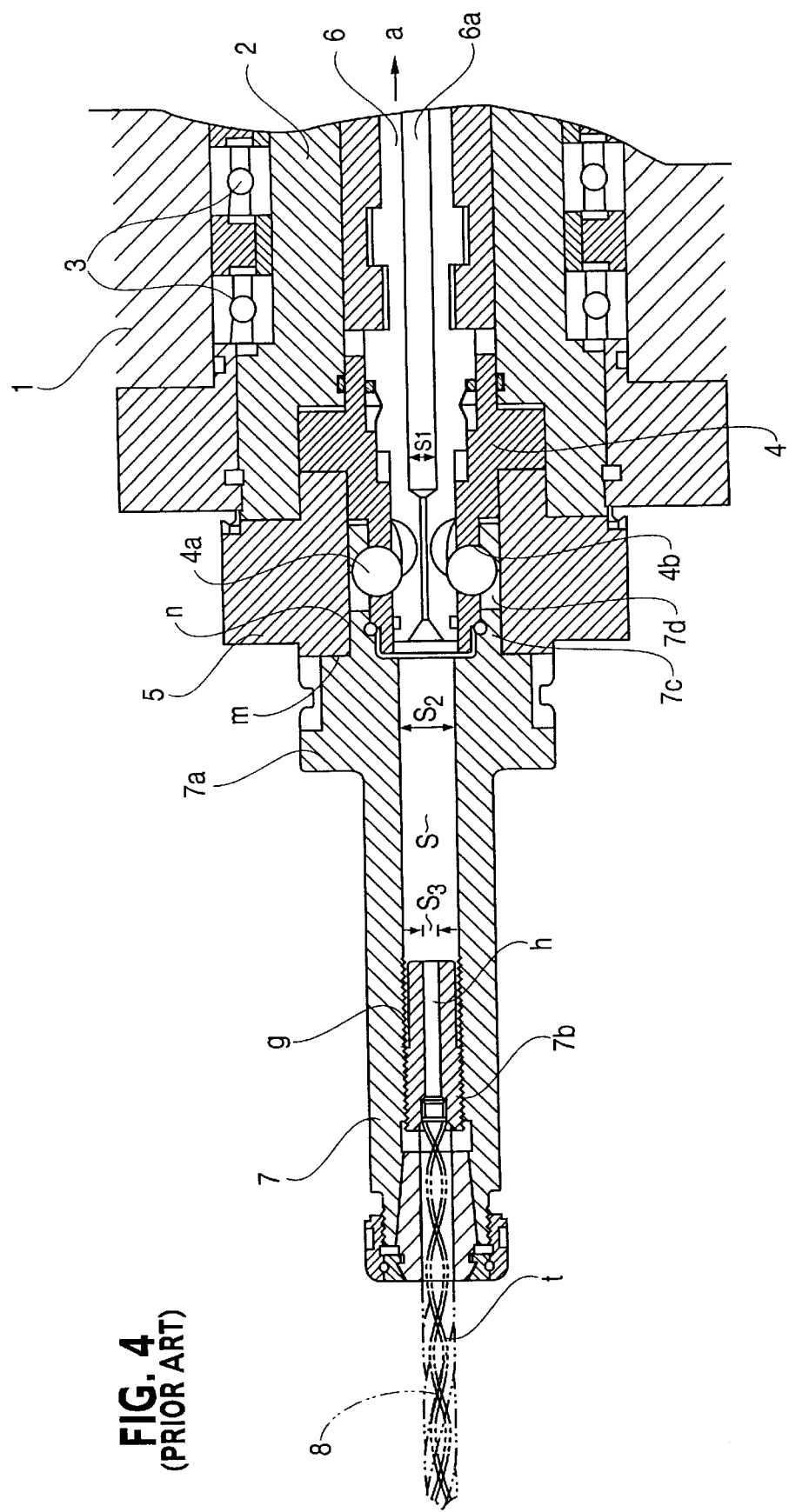
FIG. 4 is a sectional view of a conventional tool holder.

The above structure is the same as the conventional one shown in FIG. 4. In the present invention, however, a mist receiving tube 12 is provided to one side of the through hole 10b', in which the tool stopper 11 is not located. The mist receiving tube 12 is pushed toward the conical engaging body 10c by means of a spring. Specifically, a convex (k) is provided inside the through hole 10b so as to support the rear 12b of the mist accepting tube 12. The diameter of the through hole 10b is slightly small, where the convex (k) is formed.

A fixed space (f) is formed between the through hole 10b and a longitudinal outer circumference of the mist receiving tube 12 heading for the conical engaging body 10c. Besides, the tip of the mist receiving tube 12 is made into a double hub. Specifically, 15a is an outer hub, and 15a' is an inner hub. A spring 13 is provided in the space (f), pressing the outer hub 15 outwards. Therefore, its tip opening (p) protrudes outside the through hole 10b by a constant length. On the other hand, a tip opening (p') of the inner hub 15a' is flared to form a trapezoid opening. The inner hub 11a' usually remains inside the outer hub 15a, and a step (v) is formed on a base of the inner hub 15a' to engage with an end of the mist receiving tube 12.

The numeral 14 is a communicating tube installed into through holes 11a and 11b, which are provided at the centers of the tool stopper 11 and the mist receiving tube 12, respectively, so as to bridge them. The communicating tube 14 is for installing the tool holder to the main spindle. Besides, since the cutting oil mist flows directly into the communicating tube 14 during its rotation in accordance with the spindle for cutting operation, thereby causing no resistance due to different steps on a way of the cutting oil. Here, since the communicating tube 14 can suitably slide inside the through hole 12a of the mist receiving tube 12, it is adjustable in accordance with the length of the cutting edge 8.

Figure 2A:
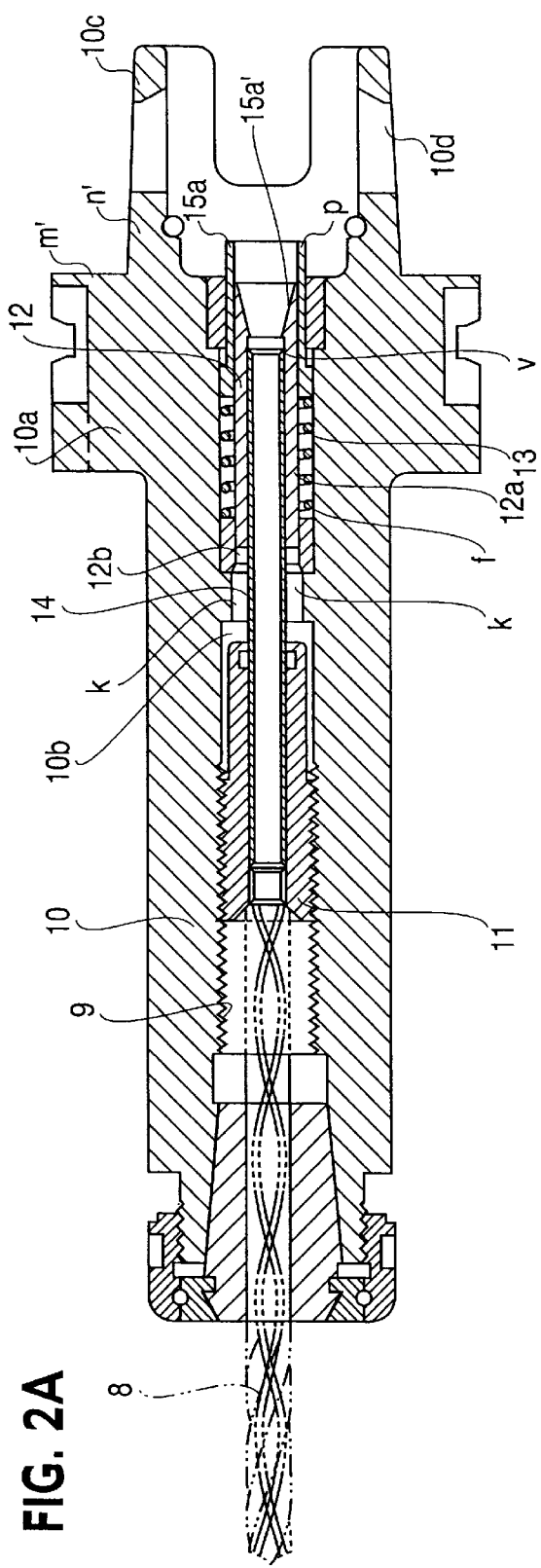
FIG. 2 is an explanatory view illustrating a communicating tube sliding in accordance with the length of a cutting edge in FIG. 1.
Figure 2B:
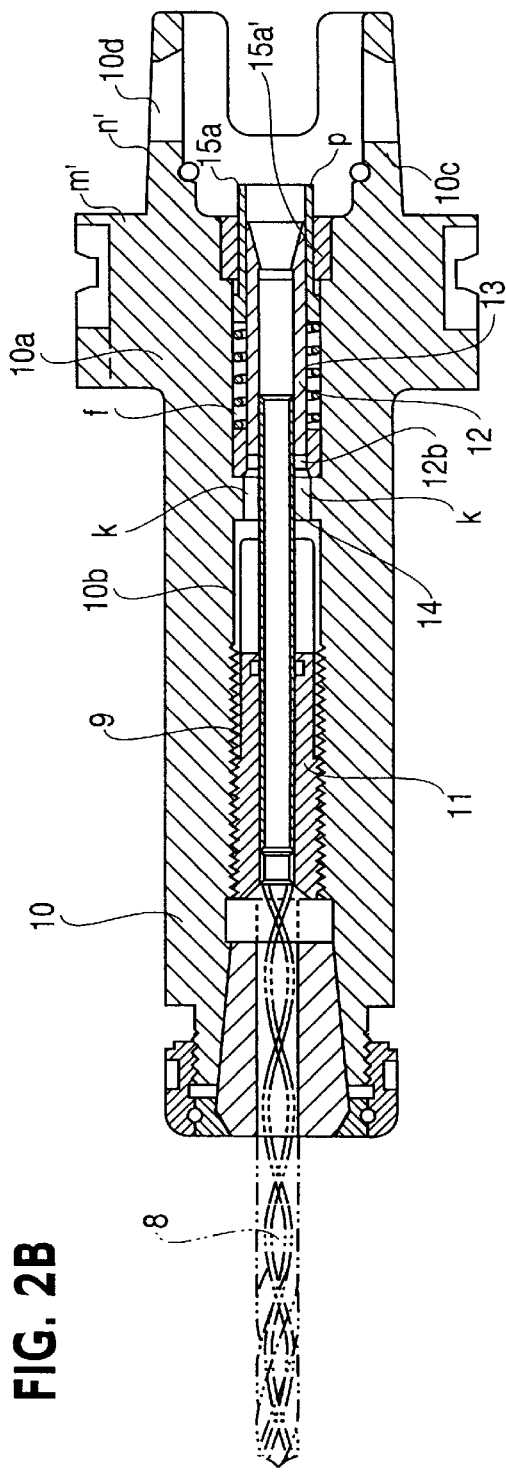

FIGS. 2A and 2B illustrate actions of the above embodiment. In FIG. 2A shows the cutting edge 8 that are enough long, not protruding outwards very much. FIG. 2B shows the cutting edge 8 protruding outwards very much.

Figure 3:
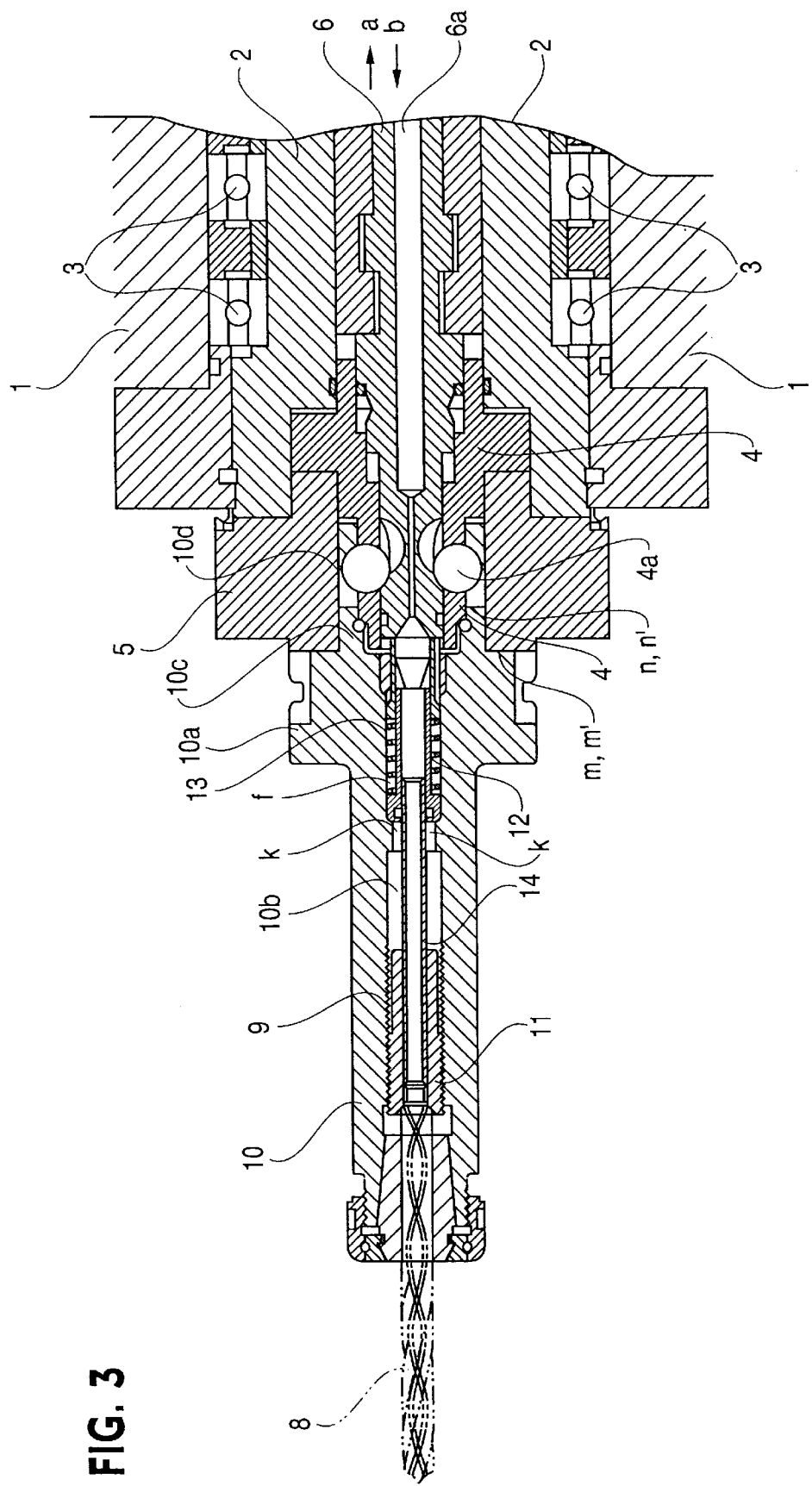
FIG. 3 is a cross-sectional view of the tool holder fixed to a main spindle.

FIG. 3 is an explanatory view illustrating the tool holder 10 installed to the main spindle 2. The conical engaging body 10c is inserted into the ring 5 of the main spindle 2. Here, the conical engaging body 10c is inserted along a tool shank taper (n) of the ring 5 and an outer circumference of a canister 4 until an outer end of a grip 10a of the tool holder 10 touches a vertical end face (m) of the ring 5. In this state, a clamp rod 6 is pulled to an arrow direction (a) by means of a non-illustrated spring mechanism, and steel balls 4a come forth from the canister 4 toward a round hole 10d formed in the conical engaging body 10c, thereby causing the tool holder 10 to be engaged with the main spindle 2.

When exchanging the cutting edge, a gripping means of an automatic tool exchanger holds the grip 10a of the holder 10. Then, the clamp rod 6 is released from being pulled in the arrow direction (a) due to the above spring mechanism. Accordingly, the clamp rod 6 is pulled in an arrow direction (b), and the balls 4, which protrudes toward the round hole 10d, move into the canister 4, thereby effecting detachment of the conical engaging body 10c from the main spindle. Thus, the conical engaging body 10c can be picked out, and a new tool holder having a cutting edge is installed in the same way.

What is claimed is:

1. A tool holder for machine tool comprising:

a tool holder 10;

a grip 10a provided on an outer circumference of the tool holder 10 to be held on an automatic exchange of a cutting edge 8;

a first through hole 10b provided in the longitudinal center of the tool holder 10;

an internal thread (g) provided on one end of the through hole 10b;

a tool stopper 11 screwed on the internal thread (g), said tool stopper 11 being movable to accommodate different lengths of the cutting edge 8 and having a second through hole 11a in the longitudinal center thereof;

a conical engaging body 10c provided on the other end of the through hole 10b, so that said conical engaging body 10c protrudes outwards;

said tool holder constrained by two faces, wherein the conical engaging body 10c connects with a tool shank taper (n) and a flanged end face (m) of a main spindle;

a mist receiving tube 12 provided on a connecting side of the through hole 10b, said mist receiving tube 12 having a through hole 12a in the longitudinal center thereof; and a communicating tube 14 provided in the through hole 12a of the mist receiving tube 12 and the second through hole 11a of the tool stopper 11, so that said communicating tube 14 bridges the third through hole 12a and the second through hole 11a to flow cutting oil directly thereinside, wherein said communicating tube 14 suitably slides in the third through hole 12a in accordance with motions of the tool stopper 11 due to the different lengths of the cutting edge 8.

2. A tool holder for machine tool as set forth in claim 1:

wherein the mist receiving tube 12 is provided with a fixed space (f) between the through hole 10b of the tool holder 10 and a longitudinal outer circumference of the mist receiving tube 12 heading for the conical engaging body 10c of a main spindle supporting frame;

wherein one end of the mist receiving tube 12 on the side of the main spindle supporting frame is made into a double hub comprising an outer hub 15a and an inner hub 15a'; and wherein a spring 13 provided in the space (f) presses the outer hub 15a with its elasticity, so that the tip end (p) of the outer hub 15a protrudes outwards for a fixed length.

3. A tool holder for machine tool as set forth in claim 2:

wherein the inner hub 15a' is flared to from a trapezoid opening.

\* \* \* \* \*